US007373902B2

(12) United States Patent
Levan

(10) Patent No.: US 7,373,902 B2
(45) Date of Patent: May 20, 2008

(54) AUTOMATED PET TOY

(76) Inventor: Michele Levan, 416 S. Hutchinson St., #E, Philadelphia, PA (US) 19147

( * ) Notice: Subject to any disclaimer, the term of this patent is extended or adjusted under 35 U.S.C. 154(b) by 232 days.

(21) Appl. No.: 11/263,734

(22) Filed: Nov. 1, 2005

(65) Prior Publication Data
US 2007/0095302 A1 May 3, 2007

(51) Int. Cl.
*A01K 15/02* (2006.01)
*A63H 33/00* (2006.01)
*A63H 37/00* (2006.01)

(52) U.S. Cl. .................. 119/702; 119/707; 119/706; 119/708; 119/710; 119/711; 446/490; 446/248; 446/331; 472/54; 472/71; 472/7; 472/55

(58) Field of Classification Search .............. 119/707, 119/702, 706, 708, 709, 710, 711; D30/160; 446/227, 490, 236, 247–255, 331, 315, 322, 446/323, 7, 10, 55; 472/51, 54, 71, 74, 7, 472/10, 55
See application file for complete search history.

(56) References Cited

U.S. PATENT DOCUMENTS

| | | | | | |
|---|---|---|---|---|---|
| 2,246,965 | A | * | 6/1941 | Yoder | 119/711 |
| 3,085,551 | A | * | 4/1963 | Helmer | 119/706 |
| 3,382,609 | A | * | 5/1968 | Neanhouse | 446/484 |
| 4,539,936 | A | * | 9/1985 | Majewski | 49/460 |
| 4,803,953 | A | * | 2/1989 | Graves | 119/707 |
| 4,930,448 | A | * | 6/1990 | Robinson | 119/708 |
| 5,261,617 | A | * | 11/1993 | Etherington et al. | 242/390.5 |
| 5,657,721 | A | * | 8/1997 | Mayfield et al. | 119/707 |
| 5,743,215 | A | * | 4/1998 | Zeff | 119/708 |
| 5,823,844 | A | * | 10/1998 | Markowitz | 446/175 |
| 5,947,790 | A | * | 9/1999 | Gordon | 446/247 |
| 6,684,819 | B1 | * | 2/2004 | Locke | 119/707 |
| D521,076 | S | * | 5/2006 | Walker | D21/385 |
| 2002/0020362 | A1 | * | 2/2002 | Noto | 119/707 |
| 2005/0150468 | A1 | * | 7/2005 | Fleischhacker | 119/708 |
| 2007/0022972 | A1 | * | 2/2007 | Morrison | 119/707 |

FOREIGN PATENT DOCUMENTS

EP 34868 A1 * 9/1981

* cited by examiner

Primary Examiner—Andrea M Valenti
(74) Attorney, Agent, or Firm—Albert T. Keyack

(57) ABSTRACT

A device for amusing a cat or other pet is provided that has a housing having a top portion and a bottom portion, a motor disposed in the housing, a belt attached to the housing via an upper shaft and a lower shaft, a string having a first end attached to the belt and a second end extending freely from the belt, and means for activating the motor. In operation the motor rotates the belt causing the string to repeatedly fling outwardly from being hidden within the frame and amuse the cat. Methods for amusing a pet are also disclosed that comprise the steps of automating a string, whereby a free end of the string appears and disappears from view. These methods are preferably accomplished by attaching one end of the string to a rotating belt within a housing.

16 Claims, 4 Drawing Sheets

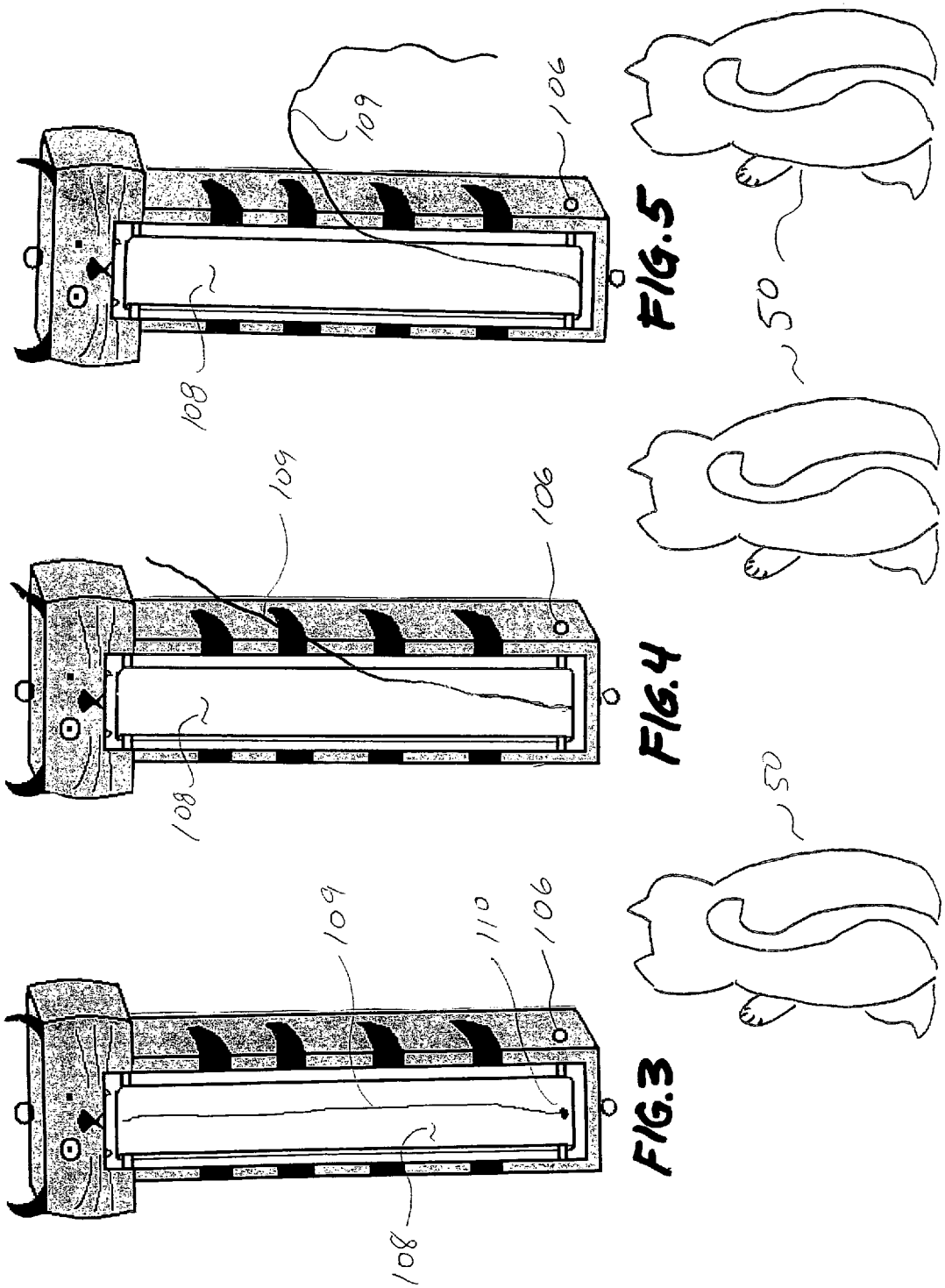

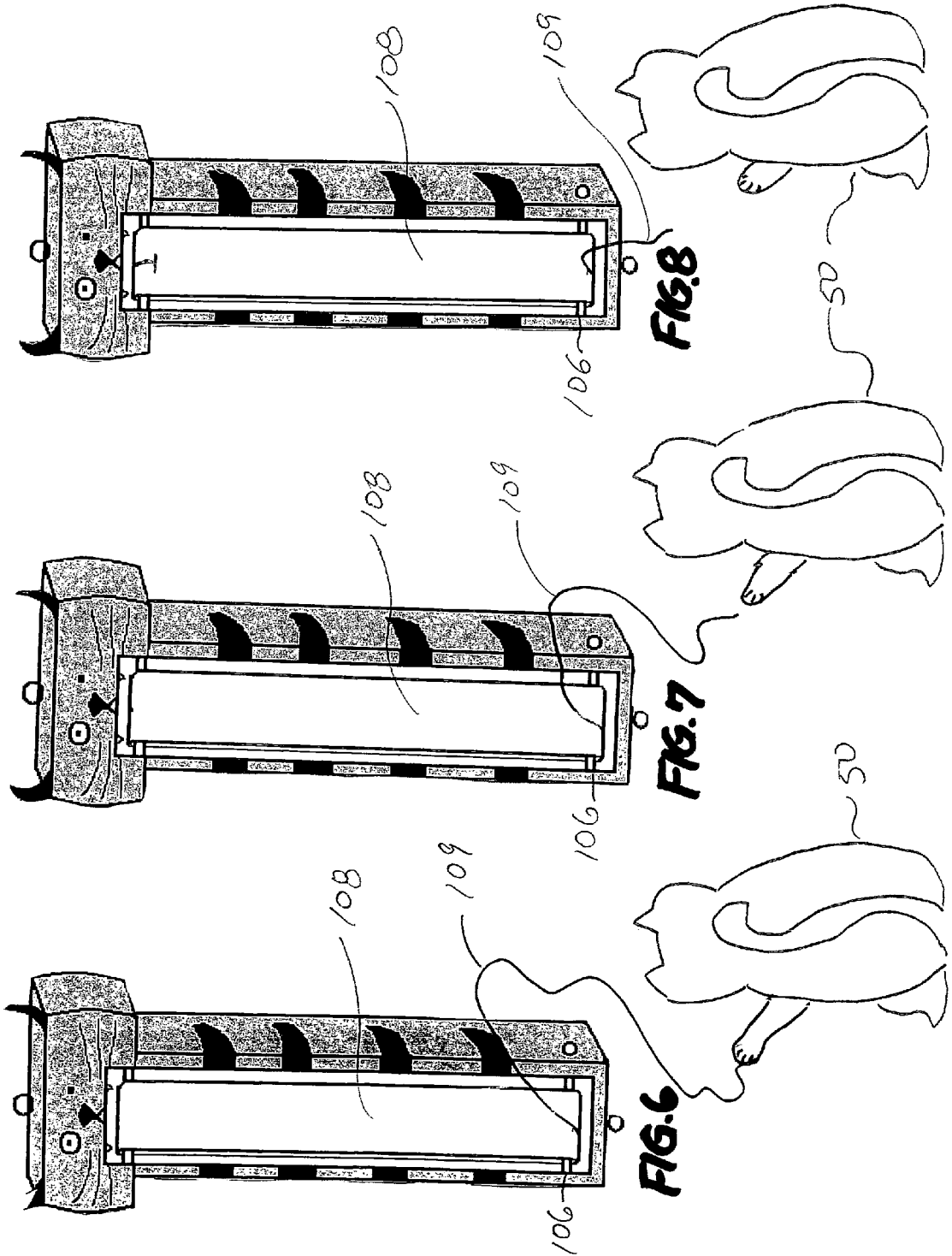

AUTOMATED PET TOY

FIELD OF THE INVENTION

The present invention relates to pet toys. In particular, the present invention is directed toward a movable string toy that may be attached to a door or similar support, and in operation provide entertainment and exercise as a pet attempts to catch the string.

BACKGROUND OF THE INVENTION

Cats and other pets have a deep-seated natural predatory instinct. The oldest, simplest, most efficient and most beloved cat toy of all time is the moving string. There is no domestic cat that does not love to chase string. This activity brings out, reinforces, and satisfies their ingrained urge to hunt. Even the oldest, laziest cat is enticed by a moving string. Although numerous types of string toys and techniques for playing with cats are well known, they all entail a human having to move the string. Although everyone has some sort of string in his or her home, and this is the therefore the easiest way to engage a cat in activity, a "playmate" must move the string in order to entertain the cat. This task can get quite monotonous and boring. In addition, many cat owners do not have the necessary time to engage their cats in healthy amounts of playtime. Therefore, it would be desirable to provide a form of this simplest and most beloved cat toy in an automatic fashion and thereby engage a cat in play while the cat owner or another playmate is not present or is too busy.

Various automated cat and pet toys are known in the art. For example, U.S. Pat. No. 5,657,721—Mayfield et al. discloses a moving target cat toy with a motion sensor. U.S. Pat. No. 6,058,887—Silverman discloses an automated cat toy with a rotating arm. U.S. Pat. No. 6,892,675—Comerford discloses a cat toy that uses an electric motor to rotate a hunting decoy in an unpredictable manner. However, up to this point, there has not been an automated cat toy that has utilized the simplest, most efficient, and most enjoyed cat toy of all the time, a moving piece of string. Thus, there remains a long-felt and as of yet unmet need to provide a cat toy capable of entertaining a cat without human intervention. It would be desirable that the cat toy is attractive so as to be an asset to the decor of the home, easily set up, installed and that takes up a minimal amount of space.

SUMMARY OF THE INVENTION

The present invention provides an efficient and stimulating cat toy that automates a moving string, which is all a cat needs to be happy and utilize its innate hunting skills, by providing an apparatus comprising a housing, a rotating portion actively driven by a motive power source, and at least one string affixed to the rotating portion in which a free end of the string intermittently disappears within the housing and subsequently flings away from the housing when the rotating portion is activated. Preferably, the rotating portion is a belt that travels over a first and a second shaft, and one of these shafts is preferably driven by the motive power source, such as an electric motor. In certain embodiments, a sensor for detecting motion that activates the motive power source may also be provided. Certain embodiments will also include a clutch so that the belt or other rotating portion is disengaged from the motive power source upon a threshold resistance being attained. The string can be comprised of any material and preferably has a protective device affixed to its free end, or in certain embodiments, a decorative device affixed to the free end. The string may also be detachable, and can the string (or other portions of the device) can be imbued with a scent and/or flavor.

The present invention also provides methods for amusing a pet comprising the steps of automating a string, whereby a free end of the string appears and disappears from view. These methods are preferably accomplished by attaching one end of the string to a rotating belt within a housing, and in certain embodiments, includes the step of attaching the housing to a door. The belt is preferably rotated by driving a shaft with a motor, and in certain embodiments, the step of automating the string comprises the step of activating a motion sensor and/or activating a timer.

In certain preferred embodiments, the present invention provides a cat toy that has a housing having a top portion and a bottom portion, a motor disposed in the housing, a belt attached to the housing via an upper shaft and a lower shaft, a string having a first end attached to the belt and a second end extending freely from the belt, and means for activating the motor. In operation the motor rotates the belt causing the string to repeatedly fling outwardly from the frame and amuse a cat.

BRIEF DESCRIPTION OF THE DRAWINGS

FIGS. 3-8 illustrate a preferred embodiment of the present invention in operation.

DETAILED DESCRIPTION OF THE INVENTION

The present invention advantageously uses the deep-seated natural predatory instinct of cats and provides an automated version of the moving string. The most innate instinct of any cat is hunting. This was passed down to them through their ancient ancestors from the large cat families. This instinct is basic, since its original purpose was to sustain the cat with nutrition. Since the time domestic cats came on the scene approximately 15,000 years ago, they have evolved into family pets in situations where they no longer need to hunt for food as they are brought home food from the grocery store. It is therefore unsurprising that the National Academy of Sciences reports that one out of every four cats in the western world is now obese. Like humans, cats that are obese run a higher risk of developing serious health problems. Under-active cats are not just obese, but bored as well. Feline boredom is often at the root of a variety of behavior problems including aggression with other pets as well as people, compulsive grooming, and depression. When cats are left alone all day, their instincts to hunt, explore, play or socialize are rarely engaged. Instead, many cats spend the majority of their days eating and sleeping.

Thus, as a result of domestication, hunting for domestic cats has taken on a background role and is essentially pursued for pleasure. When a domestic cat is allowed to go outside, it will often bring back prey such as mice, rats, squirrels, birds, and even insects. In order to hone these hunting skills, a cat's playtime from the time it is a kitten centers on practicing these skills. All a cat needs to keep its attention is something that mimics the movement of prey. One example is string which is always around any household in many forms: twine, ribbon, yarn, thread, etc. Cats naturally stalk any moving string. Therefore, the present invention provides a moving string device to amuse pet cats while at the same time helping them become mentally and physically fit by engaging them in activity when the cat owner is out or too busy to interactively play with the cat.

Figure 1:
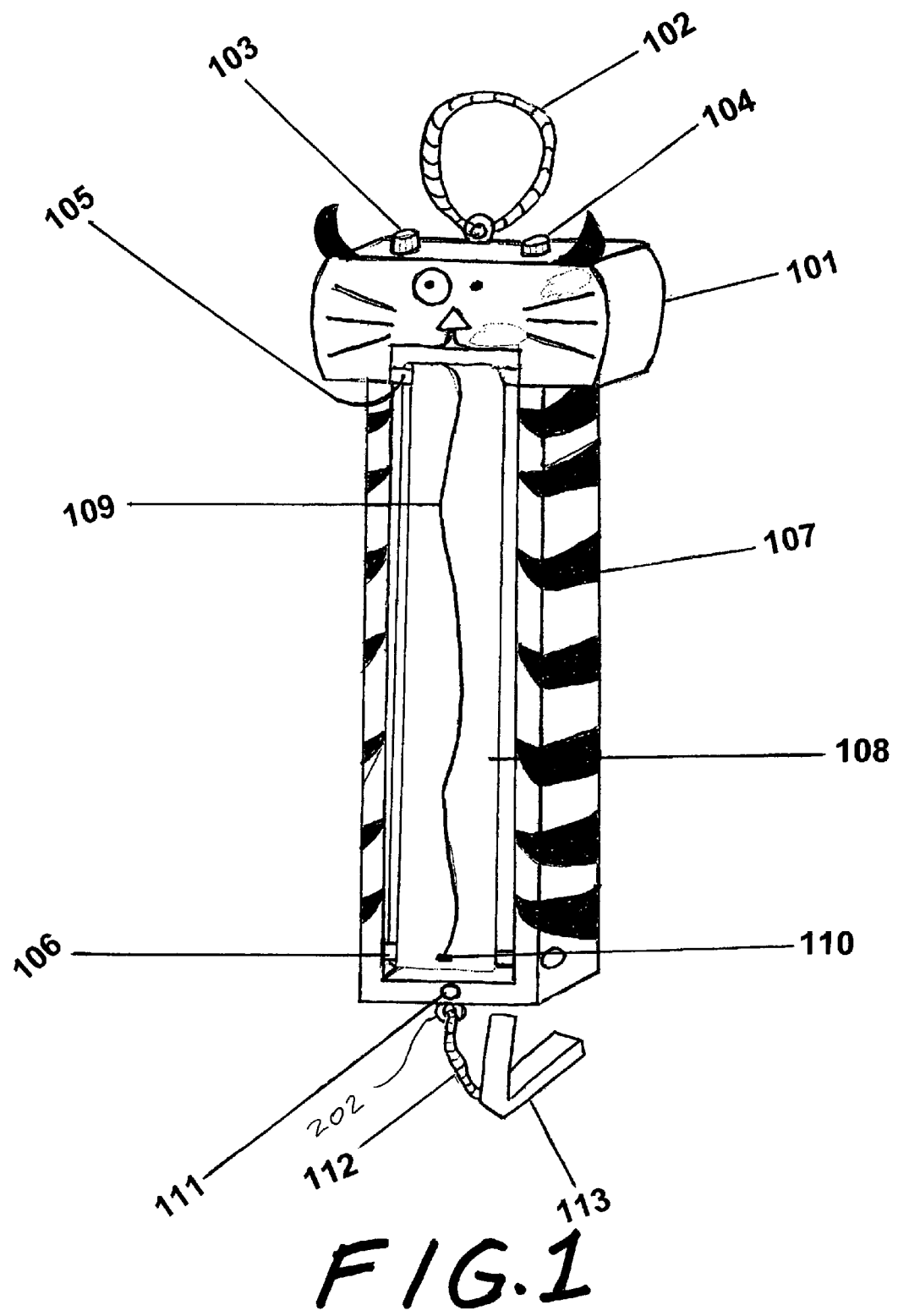
FIG. 1 is a front perspective view of the preferred embodiment of the present invention.

Referring now to FIG. 1, there is shown a front view of the preferred embodiment of a device made in accordance with the present invention. The preferred embodiment of the device is easily hung to any standard door/door knob (can be hung by an S-hook, loop of elastic, with Velcro or any type of string or cable). As seen in FIG. 1, a loop 102 may be provided for this purpose, and this loop 102 may be either elastic or inelastic (e.g., plastic or coated steel cable) and may either be looped over a doorknob or attached via any similar situation. Alternatively, the entire loop 102 can be replaced by and "S" hook or the like. As will be readily appreciated, the device may alternatively be hung on a wall or from a ceiling by any of a number of conventional means. The device can also be adapted to sit flat on the floor (either vertically, substantially as shown in FIG. 1 or horizontally) by providing a base sufficient to maintain stability during play. In any of these preferred embodiments, the mounting structure will insure that the device is sufficiently secure while a cat is playing and to avoid accidents or damage. Thus, for example, as further illustrated in FIG. 1, in the preferred embodiment shown there is also an attachment cord 112 and an "L" shaped piece hook 113 located at a lower attachment point 202 to secure it to the bottom of any door when the cat is playing with the toy. The elastic does not need to be very long but it also needs to be sufficiently elastic so that it will compensate for a door that is longer or shorter than a "standard" door. In certain embodiments, the housing 107 has felt patches 117 or similar protective elements on its rear surface that prevent any scratching or damage to the door.

The embodiment illustrated has a frame 107 that may be made of lightweight, hard plastic, wood, plexiglass or any similar durable material. The frame 107 preferably includes an upper portion 101 that houses a motor and related operative apparatus, as explained below and illustrated in FIG. 2. As shown, the frame 107 can be decorative in nature and as illustrated can resemble a cat or otherwise be decorated or have decorative features. In the preferred embodiment illustrated, the base color of the toy (which is preferably made of lightweight, inexpensive plastic) is most preferably an orange color. The cat face can be a decal that will be applied to the orange background. The ears are attached and made out of a durable material (felt or vinyl). The black stripes down the sides and front of the toy can also be decals. In other versions, the toy could be any color or pattern, have any sort of illustrations on it. Thus, the housing 107 may be made to look any way (e.g., solid colored, patterned, illustrated) and in any other fashion (decals, hand-painted, plastic could be molded with colors),in order to go with any home decor and is not limited to the decorative aspects illustrated.

As also explained in further detail below, a motorized rotating flat belt 108 is mounted within the frame 107 on an upper shaft 105 and a lower shaft 106. The belt 108 has a string 109 attached at one end 110 and rotates such that when the loose end of the string gets to the top of the belt 108, it automatically flings out. In other embodiments, there is more than one rotating belt, and in certain embodiments the belts are counter-rotating. Also, there may be more than one string in certain embodiments, regardless of the number of belts. The cat will be able to bite, paw, or play with the string 109 as it repetitively travels along with the belt 108, as explained in detail below. Preferably, the motor is run by batteries. Other methods of running the motor include mechanical wind up, solar power, or being plugged into an electric outlet. In preferred embodiments, a clutch mechanism is provided so that when the cat stops the string from rotating, the motor disengages to prevent it from burning out, and then when the cat lets go, the string continues to rotate and appear and then disappear, over and over again, for the cat's amusement. In various embodiments, the motor runs at either constant speed or intermittent speeds, as desired. Variable speed controls such as a knob 104 vary the speed of the motor and hence the speed of the belt 108 over time in either a regular manner or an irregular, erratic manner.

The string 109 is preferably made out of any long narrow fabric or material that a cat would want to chase (cotton, silk, wool, vinyl, rayon, yarn etc). In certain embodiments the string 109 (or the belt 108 or the frame 107) is imbued with a scent or fragrance and/or a flavor. In certain alternate embodiments, the string 109 is covered with a polymer shell or similar coating in order to make it a bit "stiffer" and the result in a slightly different flinging effect. Such embodiments utilize any type of coating that is non-toxic. In general, the material of the string 109 should be sufficiently robust so that a cat cannot easily fray or shred it. In one example, fusing or melting the free end of the string 109 can achieve fray-resistance or if the material will not fuse or melt, non-toxic glue material can be applied to reduce or prevent fraying. Alternatively, the free end could have a ferrule or similar covering applied to the end, as is typically found on the end like a shoelace, or it could be knotted to stop it from fraying. In further embodiments, an accessory of a decorative or play-enhancing nature could be attached, e.g., a feather or fabric element.

The attached end 110 of the string 109 is preferably sewn or attached to the belt 108, and preferably, the string 109 should be about 2" longer than one-half the circumference of the belt 108 in order for it to be long enough to "fling" out. The attached end or side 110 of the string 109 alternatively can be attached so it is replaceable using any manner of conventional techniques, such as snap hooks and rings, frictional fittings, plastic latches or catches, etc. Different types of strings and lengths may be offered in this manner.

Preferably, the belt 108 is a flat elastic belt that is 0.75" in width, but it may be any width. The flat elastic belt 108 may be any color but in the preferred embodiment it is white. The tension of the elastic belt 108 onto the shafts should allow free movement. The belt 108 can be made out of any type of fabric or material, but it is preferred that the material chosen be elastic in nature. As explained below with reference to FIGS. 3-8, the belt 108 should rotate from top to bottom but it may also rotate from bottom to top. In certain embodiments, two or more belts are provided and these may either rotate in the same direction or be counter rotating.

As illustrated, the belt 108 rotates in a vertical frame 107, however, in alternate embodiments, the belt 108 rotates on a triangular shaped frame with 3 shafts, a circular frame or other types of frames with several shafts. The belt may also rotate on a horizontal frame with 2 shafts, essentially turning the frame 107 illustrated in FIG. 1 on its side.

Figure 2:
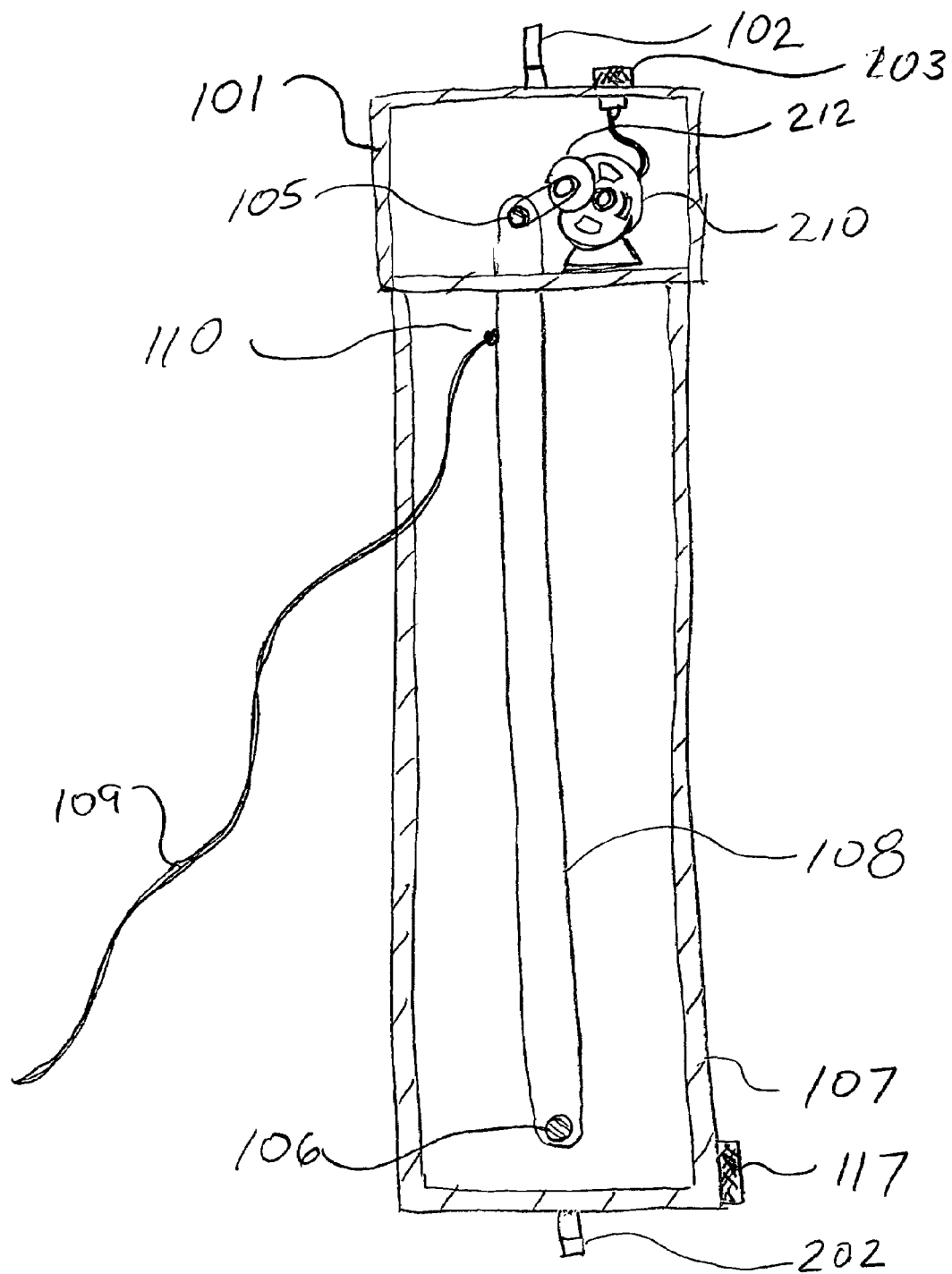
FIG. 2 is a side elevation sectional view taken along line 2-2 in FIG. 1.

Referring now to FIG. 2, further details of the embodiment shown in FIG. 1 are visible. As noted above a motor 210 is mounted within the upper housing 101 and is preferably connected to and drives the upper shaft 105. Both the upper shaft 105 and the lower shaft 106 are knurled or textured in order to frictionally engage the rotating flat belt. The motor 210 in certain embodiments may have a speed control in order to further entertain the cat by permitting the speed to be varied. A suitable electrical device and/or mechanical transmission or reduction gear (not shown) known to those of ordinary skill in the art may be provided to achieve the desired speed range. A variable speed drive known to those of ordinary skill in the art may also be provided to alter the speed to create a more realistic "prey" effect by having the belt run at intermittently varying speeds and creating a jerky, non-repetitive motion. In any embodiment, it is preferred that the motor 210 have a very low noise volume while in operation since cats are afraid of loud noises. Similarly, it is preferred that the motor 210 be chosen and mounted to minimize vibration because vibrations may scare the cats and also might negatively affect the workings of the device.

As noted above, the motor 210 is preferably attached to the shaft 105 via a clutch mechanism 212 for several reasons. First, when the cat stops the string, the motor disengages and therefore will not easily burn out due to constant starting and stopping. Second, cats are likely to intermittently stop the string by biting it or pawing it. As soon as the cat releases the string it is necessary for it to automatically start to rotate again via the motor in order for the toy to amuse the cat. Third, the clutch acts as a safety device, minimizing the likelihood a pet will become entangled or injured in the mechanism.

In order to control the device, an on/off switch 103 is provided that either turns the motor on and off directly, or as explained below, energizes the unit so that other control features provided in certain embodiments become operative. For example, an added feature of certain embodiments is a motion sensor. Preferably, a detector 111 such as a motion detector or heat sensor is located at the bottom of the frame 107, and is wired to the motor 210. When the device is turned on via the on/off switch 103, the device has a motion sensor setting so that when the cat approaches the toy and passes the motion detector, the toy is automatically activated, either for a specific period of time or until the cat walks away. This is beneficial for two reasons: 1) the cat may enjoy the toy when the cat owner is out or not around the toy; and 2) the motion sensor will help extend the life of the batteries that run the toy as opposed to a cat owner just turning the toy to the "on" setting which would result in the toy remaining constantly activated, which has the further problem of causing excessive wear. The motion sensor feature permits the cat to enjoy the device at all times yet preserves the life of the batteries that operate a device in certain embodiments and in general preserves all the operative components. Alternatively in certain embodiments, a timer may be used as a less expensive alternative to a motion sensor. The pet owner would turn the motor on to a "timer" setting and the timer turns the motor off after a predetermined time interval.

The operation of the present invention is further explained with reference to FIGS. 3-8, which illustrate a sequence in which a cat 50 plays with a device made in accordance with the present invention. In general, the string 109 travels around with the belt 108 and repetitively "flings" out, causing the free end to hit the floor. The string 109 then convolutes or undergoes a serpentine motion as the fixed end 110 travels under the lower shaft 106. The string 109 is then most preferably hidden from view for a brief period of time before reappearing at the upper shaft 105, starting the cycle over again. As shown in FIG. 3, the attached end 110 of the string 109 is at the bottom of the device and the belt 108 is moving in a downward direction, as illustrated by the arrow. As the belt 108 moves the string 109 over the lower shaft 106 the string 109 is thrown outwardly from the surface of the belt 108, which is appreciated by viewing FIGS. 4-5 in sequence. Turning now to FIG. 6, it can be seen that as the fixed end 110 of the string travels upwardly (inside be frame, not visible) the exposed end of the string becomes shorter and "snaps" or oscillates toward the ground as shown, and as further seen in FIG. 7. It is typically but not necessarily during the phase illustrated in FIGS. 6-7 that the cat 50 usually attempts to trap the string 109. However, as more clearly seen in FIG. 8, it is immediately after the "snap" or "fling" of the string 109 that because the fixed end 10 is moving upwardly (not seen) that the exposed length of the string becomes shorter and eventually disappears. Referring still to FIG. 8, it can be seen that the fixed end 10 preferably emerges from the top of the frame before the free end of the string finally disappears from view. It will thus be appreciated that in this embodiment, the string 109 is becoming visible again even before the free end disappears, and thus the cat's attention does not wane and instead the cat will set itself in anticipation of the reappearance of the free end so it may attempt to catch the string upon the "fling" soon to again occur.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. An animal toy comprising:
   a housing comprising a front side having an opening and a back side, the front side and back side together defining an interior chamber;
   at least one moving portion comprising a belt having an outward surface facing the opening and the outer surface of the belt substantially exposed along the length of the opening, said moving portion actively driven by a motive power source, wherein the belt travels over a first and a second shaft; and
   at least one string having a free end and a fixed end wherein the fixed end is directly affixed to the outward surface of the belt, whereby, upon activation of the moving portion, the free end of the sting intermittently disappears within the interior chamber of the housing and subsequently flings through the opening and is thrown outside the interior chamber and away from the frot side of the housing, wherein the belt has a circumference and the string has a lenght that is longer than one-half the circumference of the belt, but shorter then the total circumference of the belt.

2. The apparatus of claim 1 wherein the motive power source is an electric motor.

3. The apparatus of claim 2 wherein the electric motor is battery powered.

4. The apparatus of claim 1 further comprising a sensor for detecting motion that activates the motive power source.

5. The apparatus of claim 1, further comprising a clutch wherein the one moving portion is disengaged from the motive power source upon a threshold resistance being attained.

6. The apparatus of claim 1, further comprising a protective device affixed to the free end of the string.

7. The apparatus of claim 1, further comprising a decorative device affixed to the free end of the string.

8. The apparatus of claim 1, wherein the string is detachable.

9. The apparatus of claim 1, further comprising a material imbued into one or more portions of the apparatus, said material at least one chosen from the group of a scent and a flavor.

10. A method for amusement of a pet comprising the step of automating a string, by attaching a fixed end of the string directly to an attachment point point on a belt stretched between two shafts, the belt and shafts are disposed inside a housing having a closed side and an open side substantially exposing an outer surface of the belt along the length of the open side; driving the shafts and belt with a motor; the string having a free end, whereby the free end of the string appears and disappears from view as the attachment point travels along with the belt and is alternately pulled inside and thrown outside the housing as the fixed end moves past the opening; attaching a string to the rotating belt that has a length that is longer than one-half a circumference of the belt, but shorter then the total circumference of the belt.

11. The method of claim 10 further comprising the step of attaching the housing to a door, whereby a first shaft is disposed near the floor and a second shaft is disposed vertically above the first shaft.

12. The method of claim 10 wherein the step of automating the string comprises the step of activating a motion sensor.

13. The method of claim 10 wherein the step of automating the string comprises the step, of activating a timer.

14. A cat toy comprising: a housing having a top portion and a bottom portion and a front wall and a rear wall defining an interior; a motor disposed in the interior of the housing; a belt attached to the housing via an upper shaft and a lower shaft; a string having a first end directly attached to an attachment point on the belt and a second end extending freely from the belt; and means for activating the motor, whereby the motor rotates and the attachment point travels along with the belt causing the second end of the string to alternately and repeatedly fling outwardly from inside the housing by passing through an opening in the front wall and amuses a cat; the belt has a circumference and the opening substantially exposing an outer surface of the belt along the length of the opening; the string has a length that is longer than one-half the circumference and the belt, but shorter then the total circumference of the belt.

15. The cat toy of claim 14 wherein the means for activating the motor is an on-off switch.

16. The cat toy of claim 14 wherein the means for activating the motor is a motion sensor.

* * * * *